US009328898B1

(12) United States Patent
Flasck

(10) Patent No.: US 9,328,898 B1
(45) Date of Patent: May 3, 2016

(54) HIGH EFFICIENCY HYBRID ILLUMINATION SYSTEM

(71) Applicant: Richard Arthur Flasck, San Ramon, CA (US)

(72) Inventor: Richard Arthur Flasck, San Ramon, CA (US)

(*) Notice: Subject to any disclaimer, the term of this patent is extended or adjusted under 35 U.S.C. 154(b) by 400 days.

(21) Appl. No.: 13/766,078

(22) Filed: Feb. 13, 2013

Related U.S. Application Data

(60) Provisional application No. 61/633,852, filed on Feb. 21, 2012.

(51) Int. Cl.
| F21V 7/06 | (2006.01) |
| F21V 13/04 | (2006.01) |
| G02B 19/00 | (2006.01) |
| F21V 7/00 | (2006.01) |
| G02B 3/00 | (2006.01) |

(52) U.S. Cl.
CPC . *F21V 7/06* (2013.01); *F21V 13/04* (2013.01); *F21V 7/0066* (2013.01); *G02B 19/0028* (2013.01); *G02B 2003/0093* (2013.01)

(58) Field of Classification Search
CPC ......... F21V 13/04; F21V 13/02; F21V 13/12; F21V 5/04; F21V 5/008; F21V 7/0091; F21V 7/09; F21V 7/0025; F21V 7/0066; G02B 27/0927; G02B 19/0028; G02B 19/0066; G02B 19/0061; G02B 19/0023; G02B 19/0014
USPC ......... 362/245, 244, 327, 268, 257, 308, 231, 362/235, 551, 304; 353/30, 34, 97–99
See application file for complete search history.

(56) References Cited

U.S. PATENT DOCUMENTS

| 2,591,661 | A | 4/1952 | McCandless |
| 4,171,874 | A | 10/1979 | Bigelow |
| 4,462,067 | A | 7/1984 | Altman |
| 5,001,609 | A | 3/1991 | Gardner |
| 5,142,387 | A | 8/1992 | Shikama |
| 5,309,340 | A | 5/1994 | Shigeta |
| 5,557,478 | A | 9/1996 | Winston |
| 5,727,108 | A | 3/1998 | Hed |
| 5,971,551 | A | 10/1999 | Winston |
| 6,364,487 | B1* | 4/2002 | Weber et al. ............ 353/30 |
| 6,547,416 | B2* | 4/2003 | Pashley et al. ....... F21S 10/02 362/231 |
| 6,744,693 | B2 | 6/2004 | Brockmann |
| 6,819,505 | B1* | 11/2004 | Cassarly et al. ............ 359/726 |
| 7,077,525 | B2* | 7/2006 | Fischer et al. ............ 353/43 |
| 7,185,985 | B2* | 3/2007 | Hanano ............ 353/30 |
| 7,252,410 | B2 | 8/2007 | Akiyama |
| 7,344,280 | B2 | 3/2008 | Panagotacos |
| 7,622,795 | B2 | 11/2009 | Chiang |
| 7,682,041 | B2 | 3/2010 | Lin |
| 7,832,878 | B2* | 11/2010 | Brukilacchio et al. ......... 353/99 |
| 7,897,985 | B2 | 3/2011 | Galvez |
| 7,985,015 | B2 | 7/2011 | Tasch |

(Continued)

*Primary Examiner* — Julie Bannan
*Assistant Examiner* — Arman B Fallahkhair

(57) ABSTRACT

Principles of nonimaging optics, imaging optics, etendue matching, and the Constant Brightness Theorem are used to provide an ultra-efficient solid state lighting optical system for stage and theatrical profile spotlights. Used in combination, an array of high brightness light emitting diodes, a nonimaging optical transform element, and an image forming optical element enable the design of profile spotlights capable of high brightness, low electrical power consumption, sharp gobo imaging, adjustable beam intensity profiles, and use of current industry standard accessories and elements, such as gobos, blades and irises.

4 Claims, 13 Drawing Sheets

(56) References Cited

U.S. PATENT DOCUMENTS

| | | |
|---|---|---|
| 8,123,366 B2 | 2/2012 | Akiyama |
| 8,263,993 B2 * | 9/2012 | Duong et al. .................. 257/98 |
| RE43,777 E | 10/2012 | Fujimori |
| 2006/0039160 A1 * | 2/2006 | Cassarly et al. .............. 362/551 |
| 2010/0165306 A1 * | 7/2010 | McGettigan et al. .................. G03B 21/2026 353/97 |
| 2012/0099308 A1 * | 4/2012 | Brukilacchio ................ 362/235 |

* cited by examiner

HIGH EFFICIENCY HYBRID ILLUMINATION SYSTEM

CROSS-REFERENCE TO RELATED APPLICATIONS

This patent application claims the priority date of provisional patent application No. 61/633,852.

BACKGROUND OF THE INVENTION

Currently, lighting accounts for a substantial percentage of electricity use in both the United States and world-wide. The lighting industry is moving away from low efficiency sources like tungsten filament lamps to Compact Fluorescent Lamps (CFL) and Solid State Lighting (SSL) based on Light Emitting Diodes (LED). While CFLs have better efficiency and efficacy than filament lamps, they suffer from high cost and environmental hazards. Also CFLs cannot easily be configured to produce beams of light because the etendue is large and the value of lumens per etendue unit is low.

LEDs, however, continue to improve in all performance and cost categories. The efficiency, efficacy and lumens per etendue unit for LEDs are all superior to both filament lamps and CFLs. SSL is desirable because of low power consumption, high efficacy, low heat load, lower operating temperature, smaller size, long life and reduced environmental concerns.

However, in beam forming applications the LED/SSL theoretical superiority in lumens per etendue unit has not been effectively utilized because of the difficulty of designing beam producing optics to accommodate the LED chip hemispherical Lambertian intensity distribution while producing the desired intensity profile in the target area (usually bell shaped or uniform). Direct substitution of LED emitters into optical designs originally intended for filament or arc lamps has been found wanting. This difficulty has been especially true for lighting fixtures (luminaires, and stage lighting instruments or lanterns) that generate beams of light. Spotlights, ellipsoidals, Fresnels, PAR cans and flood lights are examples of such beam generating luminaires. In contrast to such beam generating luminaires are room or area lighting, overhead fluorescent fixtures or the like.

SUMMARY OF THE INVENTION

The following definitions apply herein:
"LED" means light emitting diode(s).
"NIO" means non-imaging optic(s).
"CPC" means compound parabolic concentrator(s).
"IO" means imaging optic(s).
"hybrid" means an optical system comprising at least an element of NIO character and another element of IO character.
"planar" means substantially flat.
"plane" means a substantially flat portion of a true infinite plane.
"chip" means a semiconductor die.
"divergence angle" means the angle formed between the optical axis and the propagation vector (Poynting vector) of a light ray.
"cross sectional" means in a plane normal to the optical axis.
"object plane," "image plane," and "half-angle" are used in the usual optical engineering sense.
"NA" means numerical aperture in the usual optical engineering sense.

Accordingly, several objects and advantages of the invention are:

a) to provide a hybrid illumination system having a high collection efficiency, a high throughput efficiency, and controlled advantageous distribution of light from LED chips and the like for general illumination and specialty illumination markets.

b) to provide a hybrid illumination system having brightness, color, fading and strobing control for specialty markets such as theatrical and stage lighting.

c) to provide a hybrid illumination system having low cost, high brightness, low power consumption, small size, low weight, variable color, variable brightness, long lifetime, and environmentally friendly characteristics.

d) to provide a hybrid illumination system for floodlights, spotlights, and other luminaires with output characteristics such as brightness, color, and beam angle which are controllable either manually or electronically.

e) to provide a multi function hybrid illumination system for floodlights and spotlights incorporating into one cost effective luminaire many of the diverse functions and desirable performance characteristics of spotlights, floodlights, ellipsoidals, Fresnels, and PARs used in theatrical stage lighting.

Further objects and advantages will become apparent from a consideration of the ensuing descriptions and drawings.

In accordance with the invention, a hybrid illumination system having high collection efficiency and high throughput efficiency comprises a generally planar Lambertian light generating means, a non-imaging optics (NIO) angle to area transforming means, and an imaging optics (IO) projection means.

New classes of high efficiency light generator means comprising without limitation LEDs, Organic LEDs (OLED), and Electro-Luminescent (EL) have been and are being developed. These are generally planar and Lambertian devices emitting light into a whole hemisphere (half angle of 90 degrees).

Many NIOs transform a light pattern from large area with small NA to small area with large NA (or vice versa), in accordance with the law of Etendue Matching and the Constant Brightness Theorem. Further, many NIOs can capture all or almost all of the light from planar Lambertian emitters. In general, however, there is no assurance that such NIOs will exhibit advantageous flat (top-hat) or Gaussian (bell shaped) brightness profiles at the output port. In general, they do not. However, it has been found unexpectedly that certain compact NIO structures indeed produce desirable and useful intensity profiles at the output port.

The NIOs of the instant invention have at least two stages. A first stage captures substantially all of the light from the Lambertian source and transforms the light beam from a small area with a large half angle to a beam having a larger area with a smaller half angle while substantially preserving the etendue. A substantially cylindrical compact second stage substantially preserves the area and half angle of the beam exiting the first stage and modifies the intensity profile. Generally the intensity profile exiting the first stage is not uniform or smooth, having substantial bright rings or other objectionable non-uniformities. The second stage modifies the profile to be substantially uniform across the exit port of the second stage. The intensity profile modification accomplished by the second stage is done without substantial light loss and with a second stage length similar to the length of the first stage.

While homogenizing mixing rods are known in the art, it is universally acknowledged that the length of such mixing rods is about ten times the rod port dimension. Such rods operate by producing many randomizing reflections before light leaves the rod. The resulting large rod length is unusable in theatrical instruments and the like. In contrast, the second stage of the instant invention provides generally only one reflection to accomplish the intensity profile flattening, and thus the method of homogenization is fundamentally different than a mixing rod, and the second stage is a small fraction of the length of a mixing rod, making the NIO structure useful in theatrical lighting and similar applications.

The two stages of the NIO may be near, at, adjacent to, or contiguous with each other.

However, NIOs cannot project or focus the light as needed for many applications such as theater ellipsoidal instruments or luminaires. On the other hand, imaging optics (IO) can readily a) operate in an afocal manner or b) produce an image (either real or virtual) of an object plane by focusing or projecting light as needed when the incoming light is within the acceptance NA of the IO. However, such IOs generally cannot collect more than a small fraction of the light emitted by a planar Lambertian emitter.

Thus, a new type of hybrid illumination system combining the advantageous and desirable qualities of high efficiency planar light sources, non-imaging optics to collect substantially all (>80%) of the light generated and transform the light to a smaller half angle with a substantially flat intensity profile, and imaging optics to project the light as desired is in accordance with the instant invention. The utility of the invention is predicated on the heretofore unreported, unmeasured and unexpected result that certain compact NIO structures can be designed that exhibit substantial flat, intensity profiles at their output ports. Further, the substantially flat intensity profile at the output of the NIO can be projected, magnified, and reproduced on a distant image plane, and still further, that by incrementally increasing or decreasing the distance between the NIO output port and the IO, the intensity profile in the image plane can be transformed to a soft-edged or bell shaped profile. This controlled edge softening can be accomplished without loss of resolution of any projected gobo image.

DETAILED DESCRIPTION OF THE INVENTION

Static Description and Operation

Figure 1:
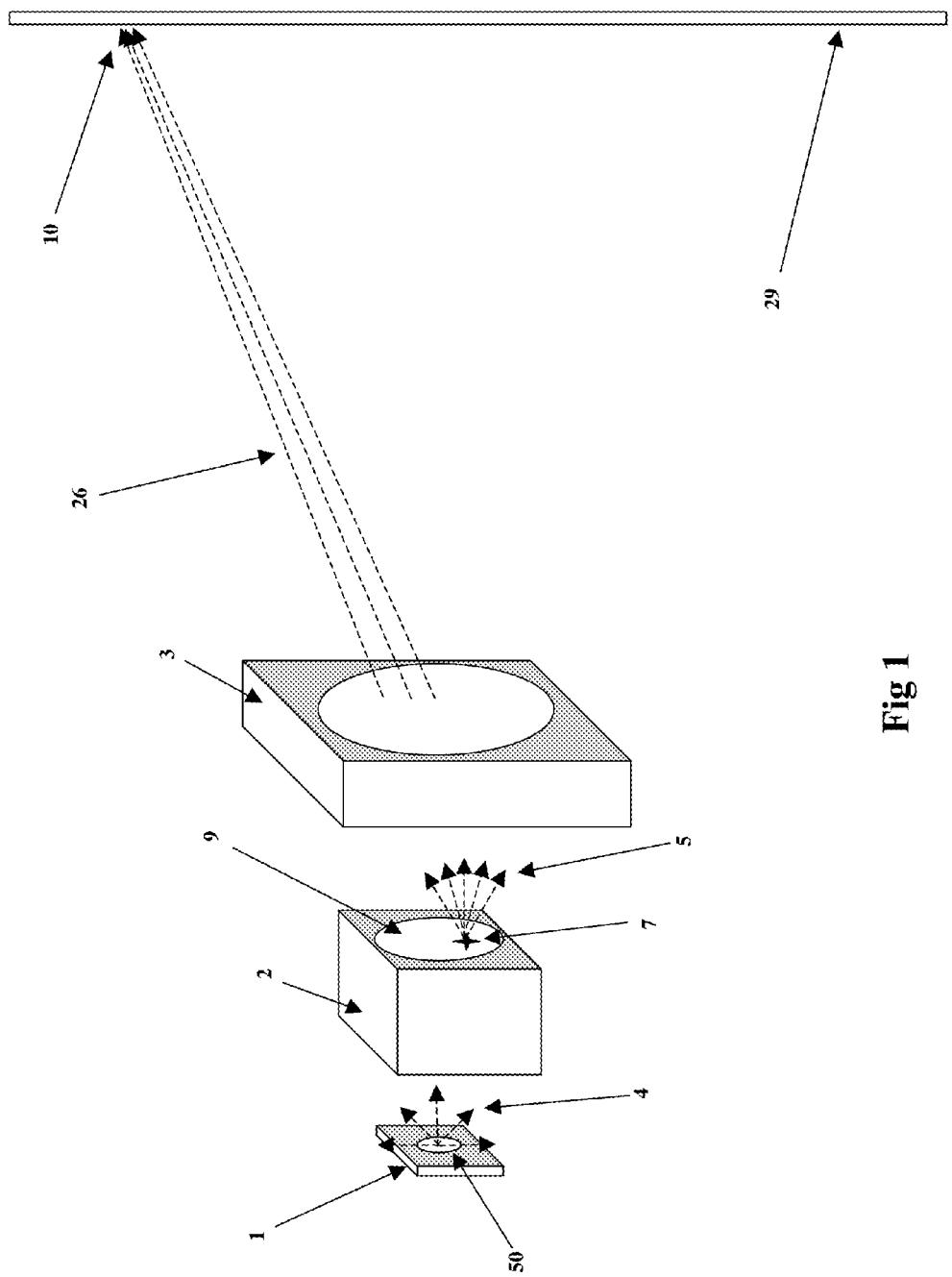
FIG. 1 shows a block diagram of the hybrid illumination system.

FIG. 1 shows a block diagram of the invention, a hybrid illumination system.

A substantially planar light generating means 1 produces a first light beam pattern 4 at the emitting area 50 having a substantially Lambertian distribution.

The light from the first beam pattern 4 enters the input port of a NIO transform means 2. A first stage of the NIO transform means 2 collects more than about 80% of the light contained in said first light beam pattern 4 and transforms said first light beam pattern 4 into a second light beam pattern having a substantially larger area and substantially smaller half angle. A second stage of NIO transform means 2 then, without substantial light loss, modifies the light intensity profile of the beam to produce a beam pattern 5 at exit port 9 having a substantially uniform intensity profile across exit port 9. The etendue of beam 4, the intermediate beam within the NIO transform means 2 (not shown), and beam 5 all have substantially equal etendue values. Thus the NA of the beam pattern 5 is substantially smaller than the NA of the first light beam pattern 4. This transformation is consistent with the Constant Brightness Theorem and etendue considerations. The NA of beam 5 is generally less than 0.55 for practical accommodation of IO means 3.

The light of the second beam pattern 5 enters an IO projection means 3 for projecting light in said second light pattern 5 to a distant illumination plane 29. The object plane of IO means 3 and the exit port 9 of the NIO means 2 are usually close, coplanar or collocated. Without substantial loss, all light rays originating from a point 7 in the object plane/exit port 9 become rays in example ray bundle 26. All rays in ray bundle 26 are substantially parallel to each other. The substantially parallel condition can be completely parallel or almost parallel to allow for focusing the object point 7 into a focused image point 10. Consistent with the aforesaid substantially parallel condition, the IO projection means 3 may work in a) a real image mode producing weakly converging rays in ray bundle 26 as shown in FIG. 1 to produce a real image, or b) a virtual image mode producing weakly diverging rays in ray bundle 26 to produce a virtual image, or c) an afocal mode with an infinite conjugate producing parallel rays in ray bundle 26. All three of such operating modes for image forming optics are well known in the art.

Illumination plane 29 is the intended area to be illuminated. Illumination plane 29 may or may not be coincident with the image plane of imaging optical projection means 3.

There are many functional equivalents for each of the light generating means 1, the NIO transform means 2 and the IO projection means 3. Some such functional equivalents are explained below.

Figure 2:
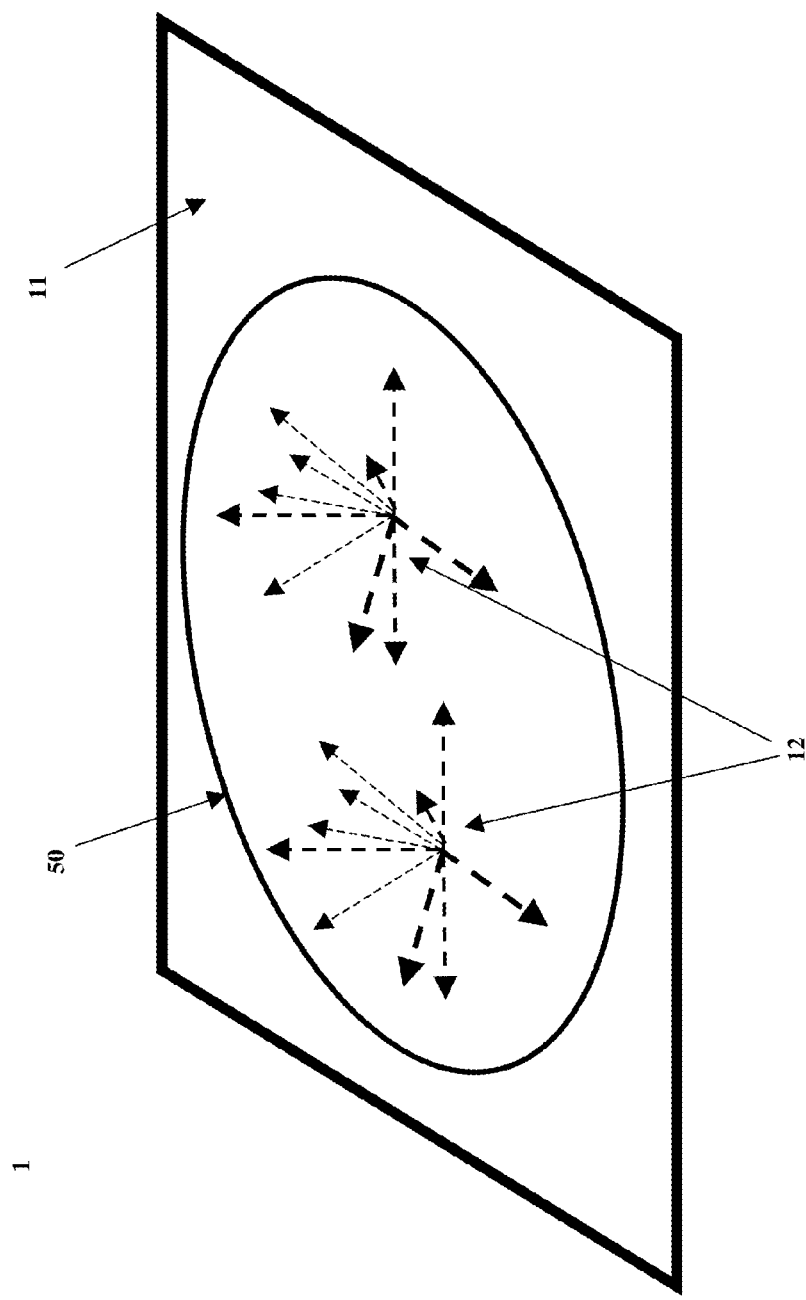
FIG. 2 shows a planar Lambertian light emitter.
Figure 3:
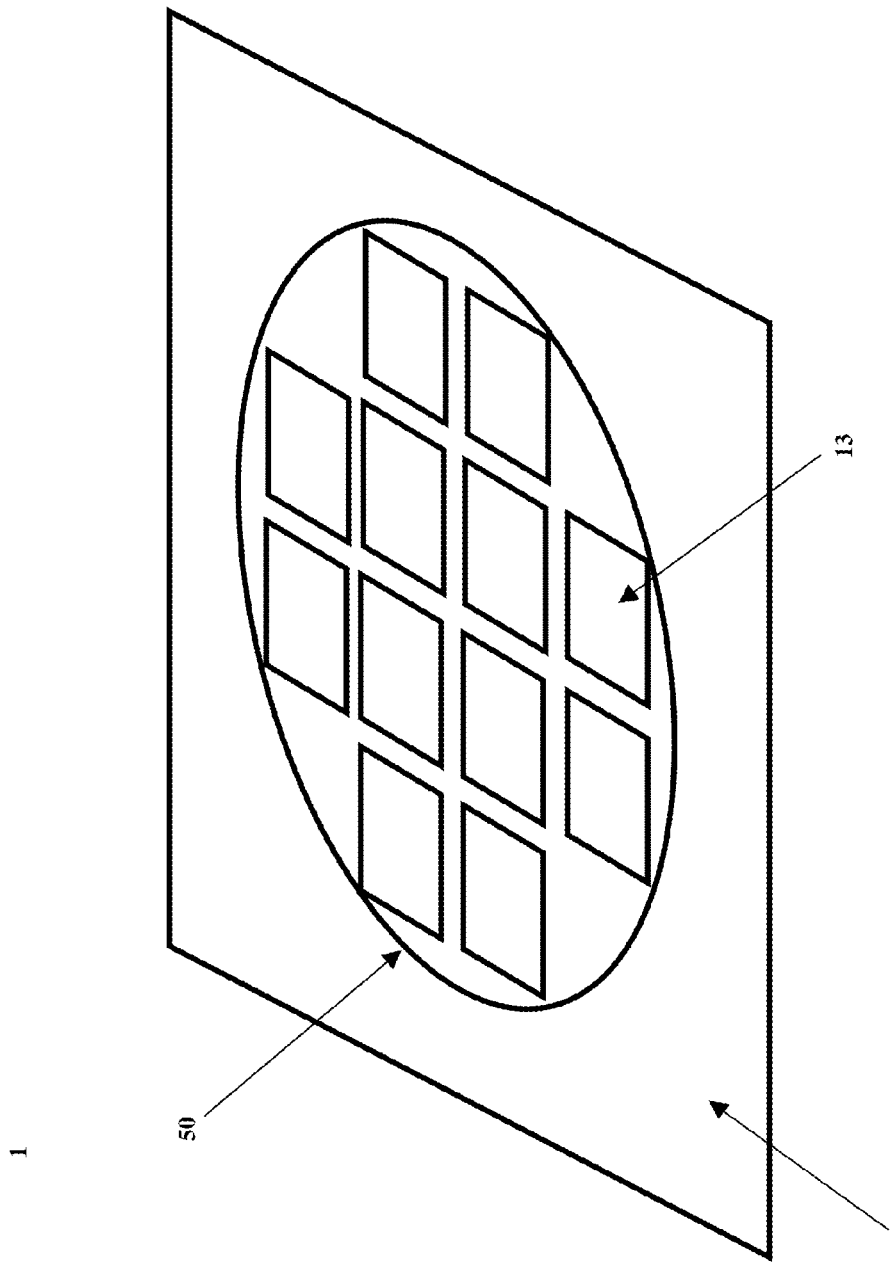
FIG. 3 shows an array of LED chips in the emitting area of the emitter.
Figure 5:
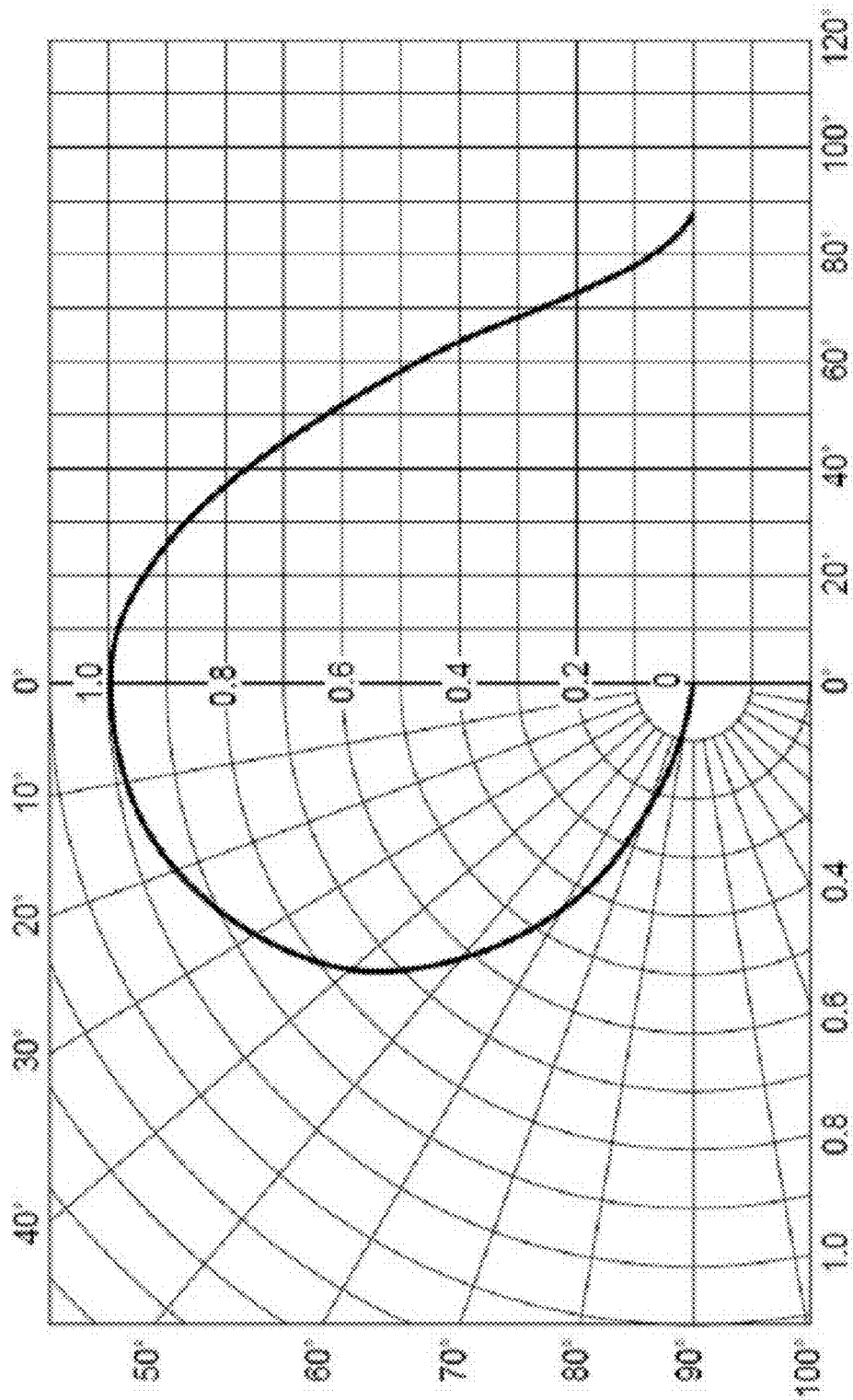
FIG. 5 shows a typical intensity distribution of a planar Lambertian light emitter.

FIG. 2 and FIG. 3 show a planar Lambertian emitter light generating means 1 comprising an emitter 11. Emitter 11 comprises a substrate such as a metal core board (MCB) or alumina substrate or aluminum nitride substrate or a combination thereof having an emitting area 50. Such an emitting area 50 has a light producing portion which is substantially flat and has a far field light intensity distribution substantially like a cosine distribution with polar angle as seen in FIG. 5. At a plurality of points within the emitting area 50, rays 12 are emitted substantially in all directions into a hemisphere. Such emitting areas 50 may comprise, without limitation, an LED chip, an array of LED chips, an OLED device, an array of OLED devices, an EL film, an array of EL films, or a combination thereof. Further, the emitting area 50 may comprise one or more sheets, disks, or domes of transparent material.

Such sheets, disks, or domes may alternatively be translucent and contain light emitting phosphor material. Examples of such emitters are the Cree XB-D, the Cree MT-G and the Bridgelux BXRA-W3000.

FIG. 3 shows a planar Lambertian emitter 11 comprising an array of LED chips 13 mounted in a substantially co-planar manner. There may be one or many LED chips in such an array 13. The LED chip array 13 is preferably optically coupled with optical cement, directly or indirectly (as for example through a transparent dome) to a solid transparent NIO transform means 2 (in FIG. 1) to avoid any air gap which would cause light loss from Total Internal Reflection (TIR). LED chips are usually covered by a transparent dielectric protective coating, and any air to protective coating interface will cause TIR at high angles of incidence thereby increasing light loss from the LED chips. In cases where a dome exists over the emitting area 50, the optical coupling can be accommodated by forming a mating dimple in the input port 18 (see FIG. 6 and FIG. 12) of the NIO means 2, into which the dome fits and is optically cemented. The array of LED chips 13 may comprise white, blue, cyan, green, yellow, amber, orange, or red LED chips, or any combination thereof.

Figure 4:
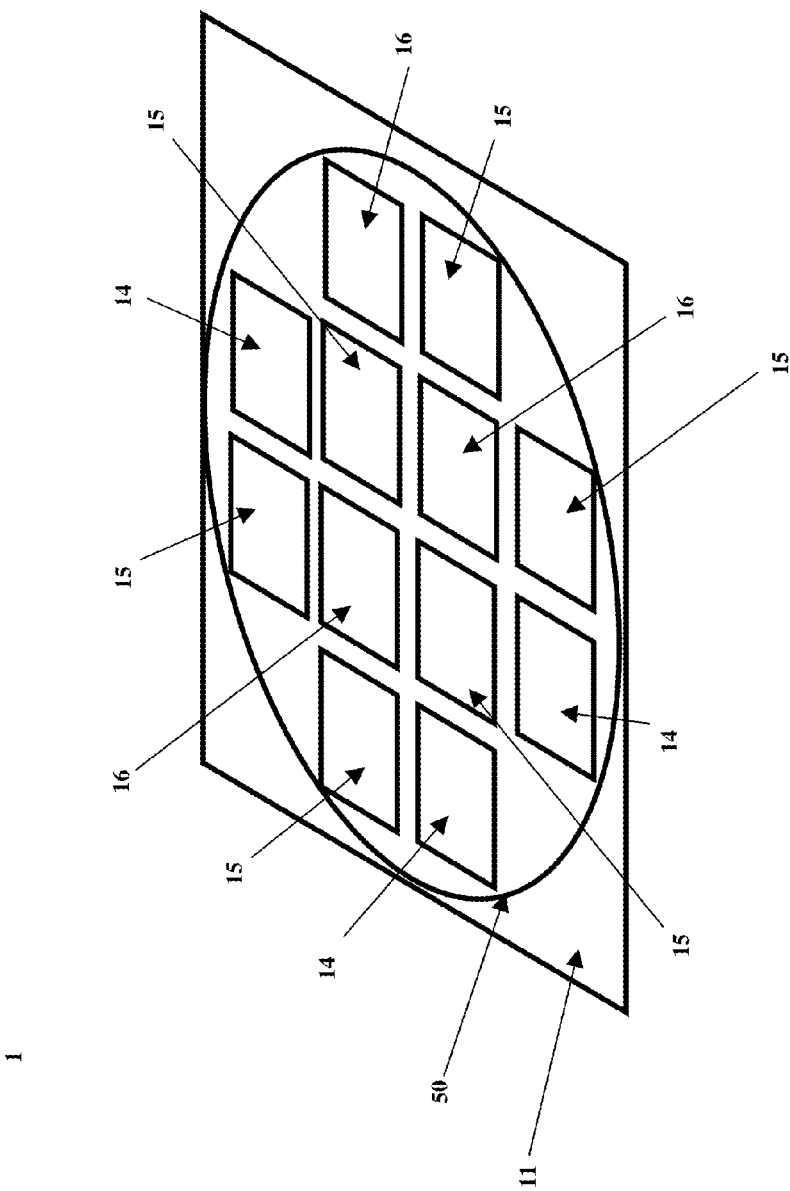
FIG. 4 shows an array of red, green, and blue LED chips.

FIG. 4 shows a planar Lambertian emitter 11 comprising an array of red 14, green 15, and blue 16 LED chips interspersed to form an overall white beam. With current LED technology, to efficiently produce a white source, about half of the chips should be green, a quarter red and a quarter blue. However, this proportion may be altered depending on desired overall color of the emitter and future brightness improvements in LED technology. Additionally, the color interspersing need not be rigorous, so long as large numbers of same color LED chips are not clumped together.

By controlling the drive currents through the LED chips, the brightness of the luminaire is controlled. Additionally, by independently varying the drive currents through same-color LED chip subsets, any color within the color gamut formed by the particular LED colors on the CIE 1931 color space diagram can be produced. The LED colors need not be restricted to red, green, and blue. Raising the number of colors in the array 13 can allow a higher Color Rendering Index (CRI). A set of LED chips of a single color may be used for a white only or a single color only luminaire. Two colors, such as blue and yellow may be used for a variable color luminaire with high white efficacy, but very low CRI. Three colors, such as red, green, and blue, can provide a relatively high white efficacy and relatively high CRI. Four or more colors (such as red, yellow, green, cyan, and blue) can produce a wider color gamut, a relatively high white efficacy, and a much higher CRI. In most applications requiring white light only, white LEDs are generally best. The typical white LED comprises a blue emitting LED chip covered with a semi-transparent polymer that contains yellow phosphor. In most applications requiring variable color as well as white light, a mix of red, green and blue LEDs is generally best.

Functional equivalents to LEDs and LED arrays include, without limitation, Organic LEDs (OLED), Polymer LEDs (PLED) and Electro-Luminescent (EL) devices which may be used singly, or in arrays, or in combination.

Figure 8:
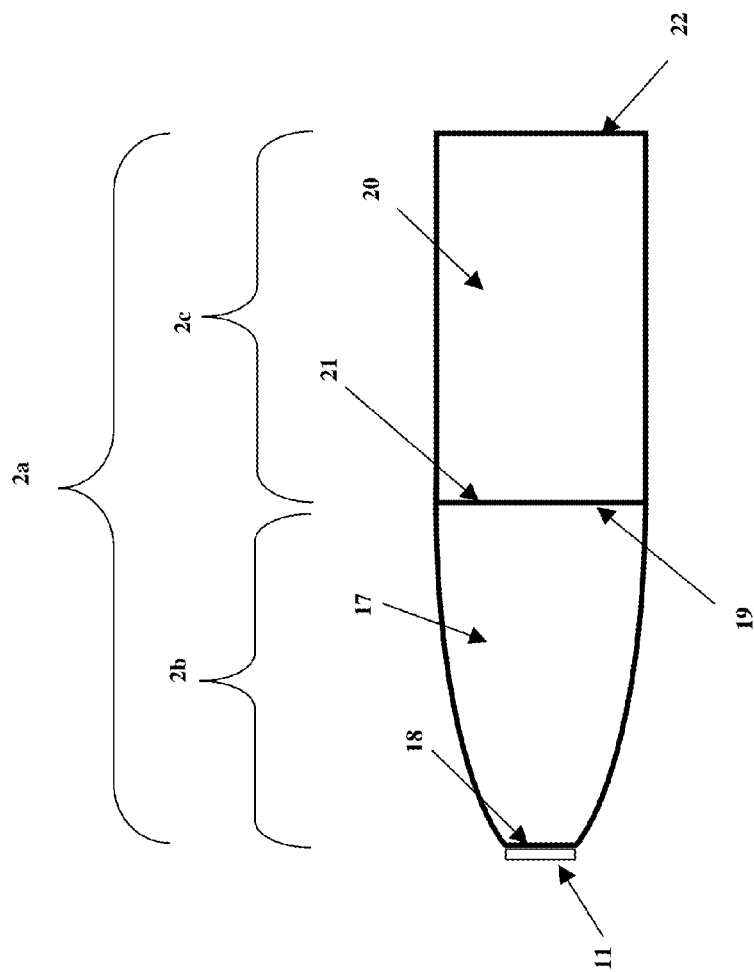
FIG. 8 shows the NIO of the Preferred Embodiment

Referring to FIG. 8, one example of an NIO transform means 2 is shown as 2a. The first stage NIO 2b is a classical CPC 17. The second stage NIO 2c is a cylinder 20.

Figure 6:
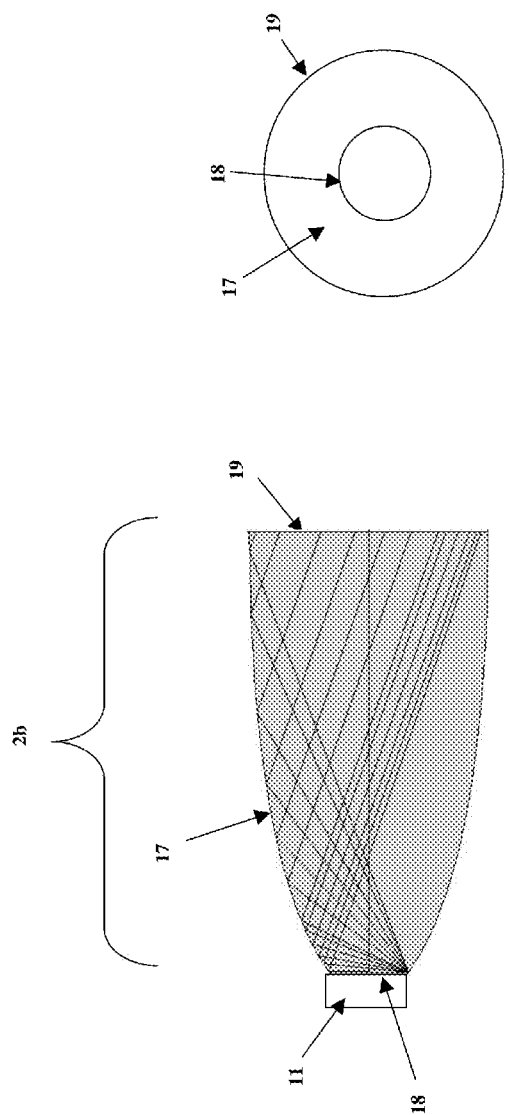
FIG. 6 shows a compound parabolic concentrator (CPC) Non-Imaging Optics (NIO) element.

Referring to FIG. 6, there are many types of first stage NIOs 2b that can be used. The CPC 17 is a well known particular type of NIO used in photovoltaic systems to collect and concentrate sunlight. In general, when used in solar energy applications as a concentrator, the intensity distribution is neither uniform nor Lambertian on the solar cell at the small end of CPC 17. In the instant invention, however, a CPC can be used in reverse. The planar Lambertian light emitter 11 is adjacent to the input port 18 of CPC 17. The CPC can be a hollow shell with a mirrored surface (dielectric or metallic) or may be formed of a solid transparent material with wall reflection provided by total internal reflection (TIR). Suitable transparent materials include (without limitation) glass, acrylic (PMMA), polystyrene, and polycarbonate.

Figure 7:
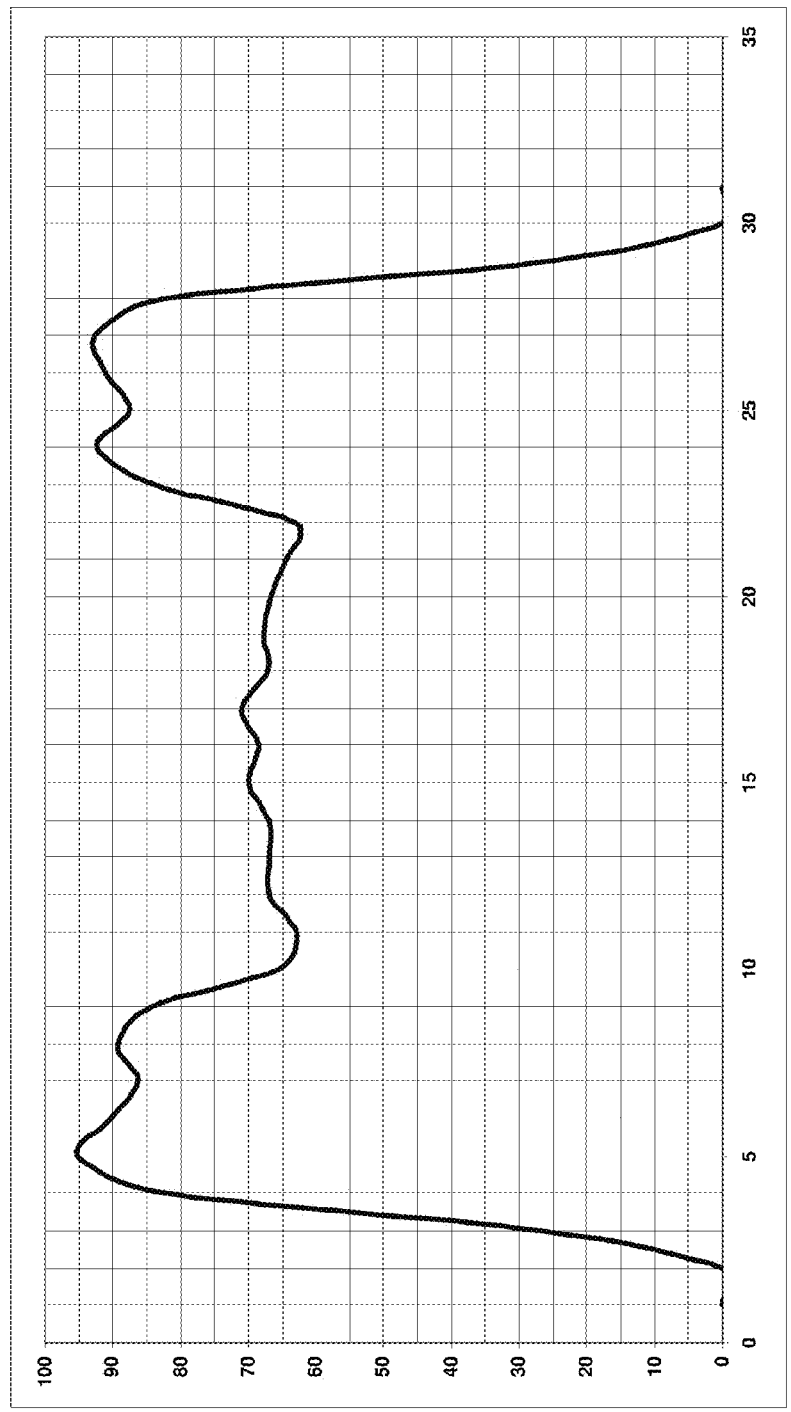
FIG. 7 shows the intensity profile across the output port of the typical CPC with an f/0.9 output.

Generally, even if the intensity profile across input port 18 is uniform, the intensity profile across the output port 19 of CPC 17 is radically non-uniform as seen in FIG. 7. It is neither a flat "top hat" profile, nor a bell shaped profile. When projected, the target illumination area would exhibit a strong, objectionable bright annual ring. However, the CPC 17 may act effectively as the first stage NIO 2b to efficiently collect the light from emitter 11 and transform that light to a larger area, smaller half angle beam at output port 19.

Referring again to FIG. 8, the first stage of the NIO transform means 2b may comprise, without limitation, a CPC, a modified CPC, a two stage CPC, a lens-mirror CPC, a hyperbolic/equiangular spiral solid concentrator, RR, XR, RX, XX, RXI, section of a cone, or a combination thereof. Many of these NIOs and other functional equivalents appear in the book *Non-Imaging Optics* by Roland Winston et al. ISBN-13: 978-0-12-759751-5.

Referring again to FIG. 8, the second stage NIO 2c is shown to be substantially a cylinder 20. A ray originating from emitter 11 on the optical axis that reflects off of the wall of cylinder 20 near cylinder entrance port 21, arrives at the cylinder exit port 22 near the optical axis. Cylinder 20 may be a reflective hollow shell, or a transparent material. Suitable transparent materials include (without limitation) glass, acrylic (PMMA), polystyrene, and polycarbonate. The reflection may be accomplished by TIR or by reflection from a metallic or dielectric coating. Alternatively, the second stage NIO 2c may be a portion of a cone with a small vertex angle, or a functional equivalent of such cylinder or cone portion.

The cross sections of the CPC 17 and the cylinder 20 may be circular, square, or rectangular or another regular polygon.

Obviously, anti-reflection coatings may be applied to the various entrance and exit ports of the NIO transform means 2a.

Referring again to FIG. 1, there are many types of imaging optics projection means 3 that can be used. In general, multi-element projection lenses having low f/#s, large object plane fields, reasonable resolution, low element count, and minimal vignetting are preferred.

Figure 10:
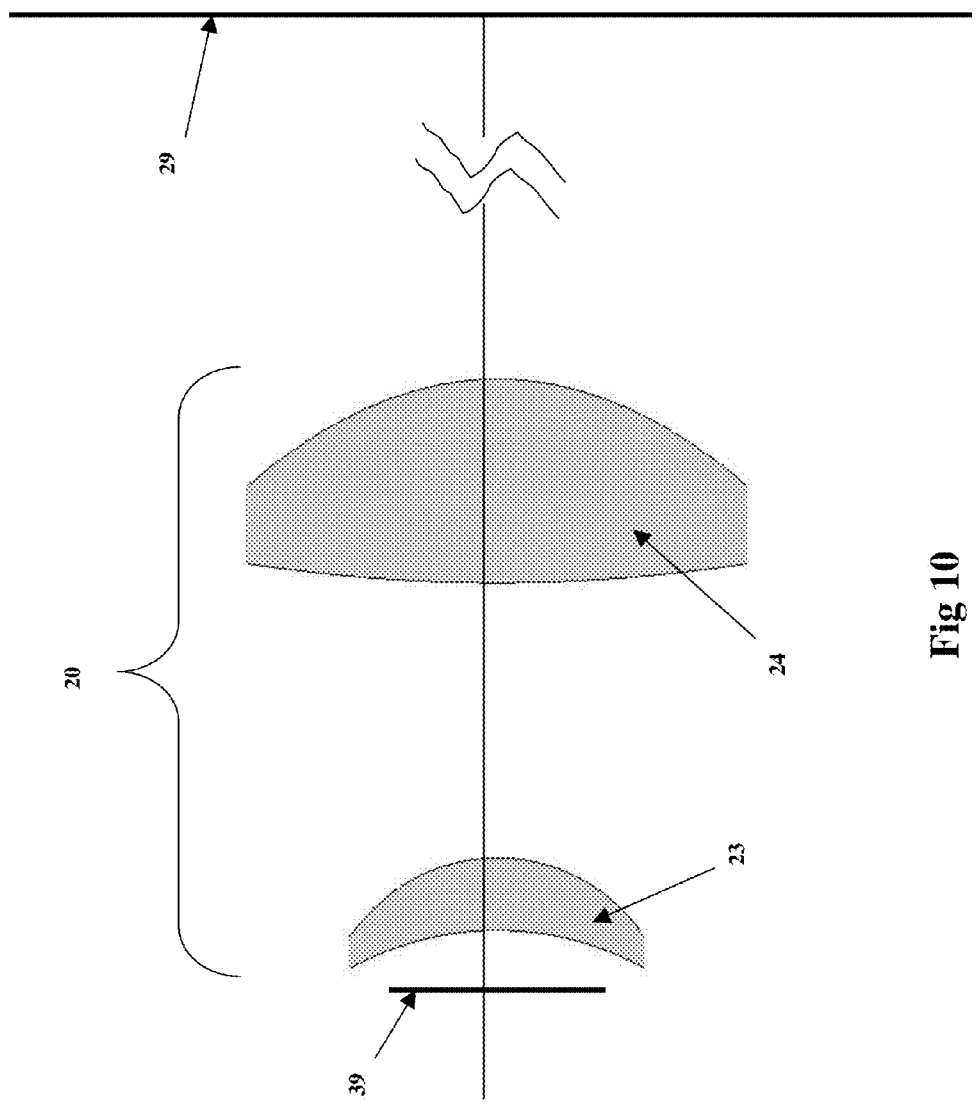
FIG. 10 shows a simple two element IO projection lens.

FIG. 10 shows an example of on IO projection means 3 as a two element projection lens 20, Many configurations comprise a field lens near, at, adjacent to, or contiguous with the object plane 39 which in turn may be near, at, adjacent to, or contiguous with exit port 22 of the NIO transform means 2a.

Figure 11:
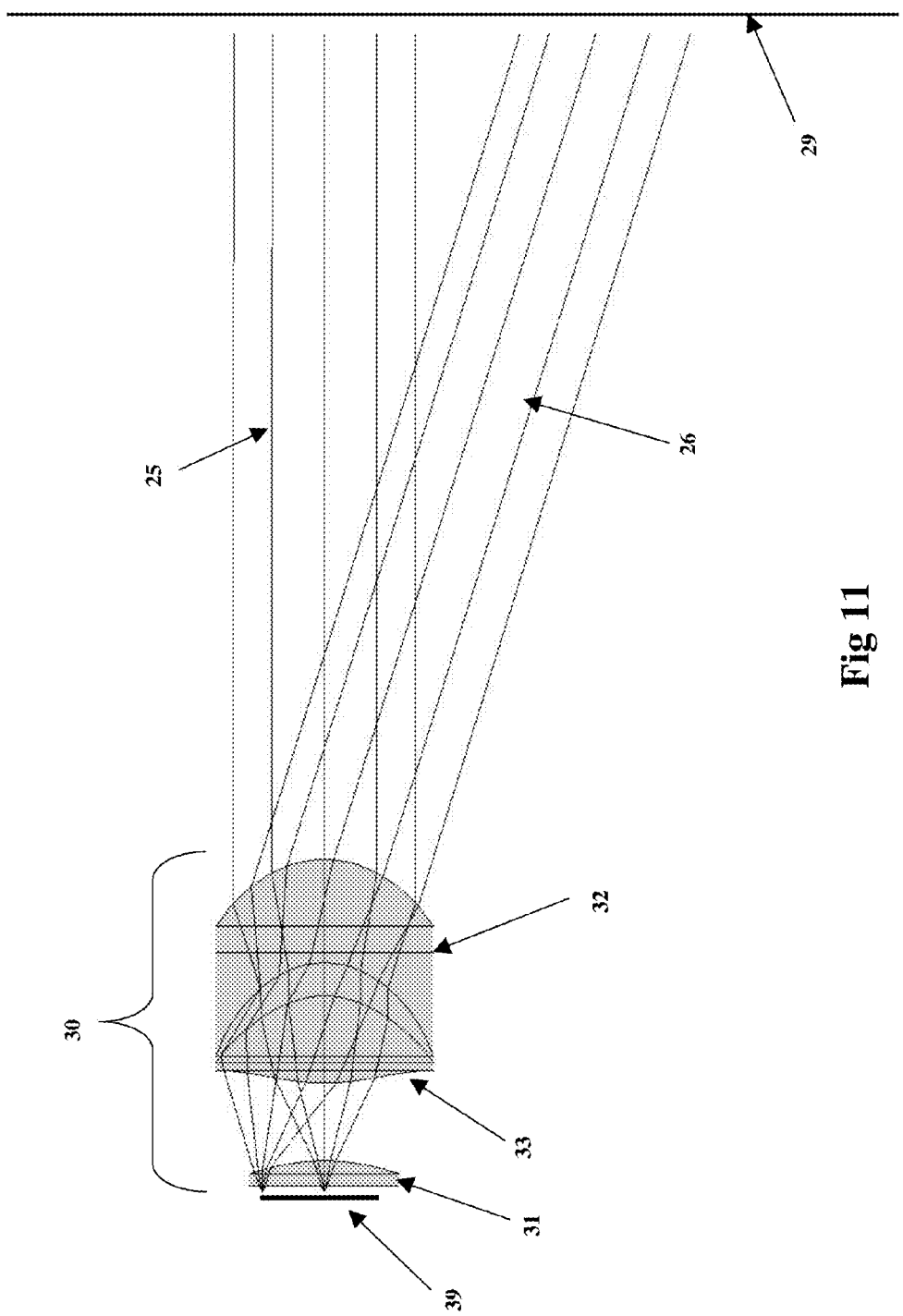
FIG. 11 shows the four element imaging optics (IO) projection lens of the Preferred Embodiment.

FIG. 11 shows a similar four element achromatic projection lens 30.

Depending on the relative positions of the exit port 22 of the cylinder 20 in FIG. 8 and the object plane 39 in FIG. 10 and FIG. 11, the projection lenses 20 and 30 can act afocally, or act to produce a real image, or act to produce a virtual image. In all cases the rays in ray bundles 25 and 26 in FIG. 11 will be substantially parallel.

Depending on the desired throw distance, beam angle and other luminaire design goals, the projection optics may comprise a wide variety of elements such as glass lenses, plastic lenses, aspherical lenses, Fresnel lenses, mirrors and reflective elements, as well as diffractive, digital, and holographic optical elements. Of course, anti-reflection coatings can be advantageously applied to one or more of the optical element surfaces. Many functionally equivalent implementations can be used as the imaging optics projection means 3 of FIG. 1, such as (without limitation) Erfles, Plossls, Double Gauss, doublets, triplets, Petzval lenses, aplanatic lenses, Tessars, Cook Triplets, projection lenses, fisheye, and zoom lenses appearing in *Modern Lens Design* by Warren Smith ISBN 0-07-059178-4.

It is clear that there are many functional equivalents for each of the light generating means 1, the NIO transform means 2 and the IO projection means 3 of FIG. 1.

Preferred Embodiment

Figure 12:
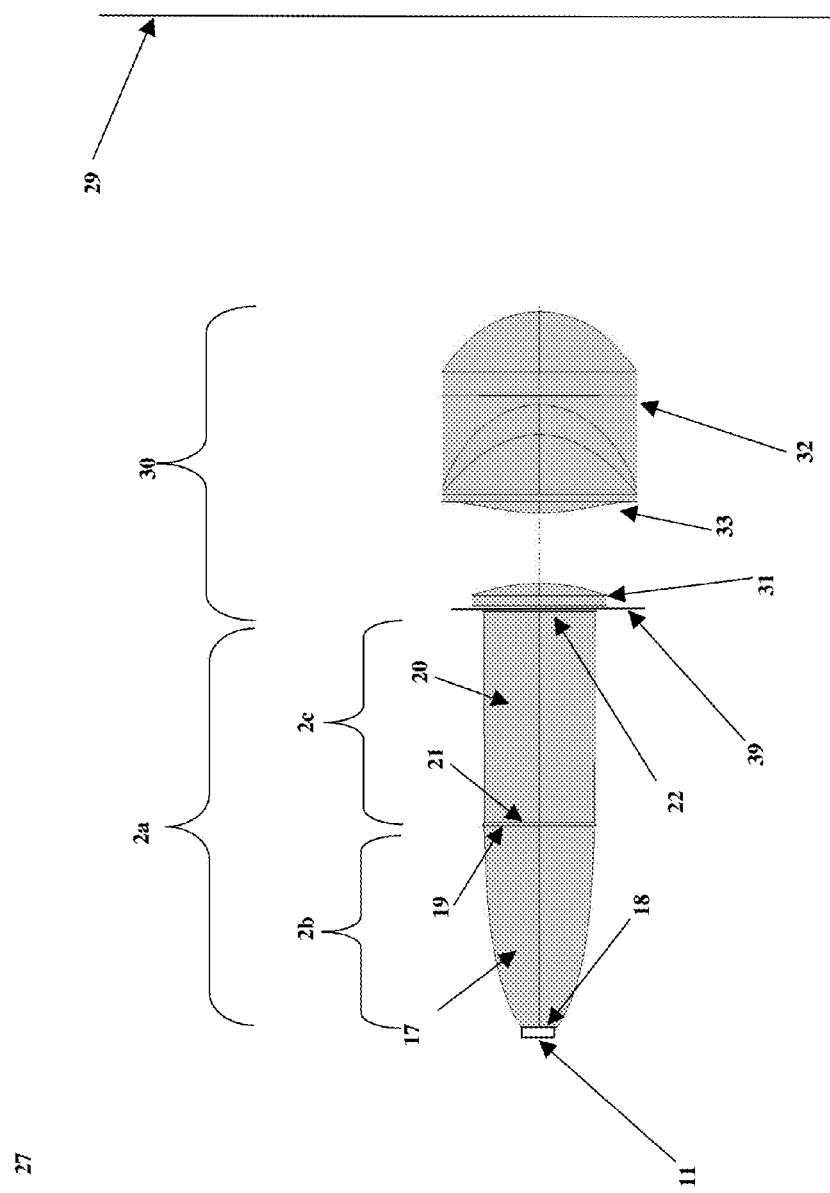
FIG. 12 shows the hybrid optical system of the Preferred Embodiment.

FIG. 12 shows the hybrid optics illumination system 27 of the Preferred Embodiment. FIG. 12 shows a Lambertian emitter 11 comprising a warm white LED array, a NIO transform means 2*a* comprising a CPC first stage 17 and a cylindrical second stage 20, and a IO projection optics means comprising lens elements 31, 32, and 33. The optical prescription of this Preferred Embodiment is given in Table 1 in BEAM4 commercial lens design software format.

by various amounts, or may be mounted in a radial pattern, or hex pattern, or any other functionally equivalent configuration. The LED chips 13 of FIG. 3 are mounted and electrically connected by well known methods in the art. Other diameters or configurations can be used to accommodate other luminaire design goals such as increased maximum luminous flux. The emitter 11 is optically cemented to the input port 18 of the acrylic (PMMA) CPC 17 to avoid air gaps between the LED chips 13 and the CPC 17.

In FIG. 12 CPC 17 is the first stage NIO 2*b*. The input port 18 is 16 mm in diameter. The exit port 19 is 50.8 mm diameter. The CPC 17 length is 91 mm. The CPC 17 is optical acrylic (PMMA). Although reflection is accomplished by TIR over most of the length of the CPC 17, there is a reflective coating on the sidewall of the CPC 17 near the input port 18 where TIR would fail.

Cylinder 20 is the second stage NIO 2*c*. Cylinder 20 is 50.8 mm in diameter and 97 mm in length. Cylinder 20 is made of optical acrylic (PMMA). Thus the length to diameter ratio is less than two, clearly differentiating it from mixing rods. CPC 17 and cylinder 20 are either cemented together or formed as one contiguous piece. There is an anti-reflection coating on exit port 22.

TABLE 1

| 13 Index | M | C | S | Z | A2 | A3 | A4 | A5 | A6 | D |
|---|---|---|---|---|---|---|---|---|---|---|
| PMMA | M | 1.915E−01 | 4.633E−02 | −6.115E+00 | 2.557E−02 | −4.435E−03 | 1.122E−04 | −3.973E−07 | −1.144E−08 | 50.6 |
| PMMA | TIR | 1.000E+12 | −2.292E−05 | −5.000E+03 | | | | | | 49.652 |
| PMMA | L | 0.000E+00 | | 1.855E+02 | | | | | | 50.8 |
| 1 | I | 0.000E+00 | | 1.855E+02 | | | | | | 50.8 |
| 1 | L | 0.000E+00 | | 1.856E+02 | | | | | | 50.8 |
| 1 | L | | | 1.880E+02 | | | | | | 60 |
| PMMA | L | −1.143E−02 | | 1.980E+02 | | | | | | 60 |
| 1 | L | 6.632E−02 | −9.934E−02 | 2.294E+02 | −2.759E−02 | 4.779E−05 | | | | 87 |
| PMMA | L | −1.628E−02 | 1.186E+00 | 2.644E+02 | −6.100E−03 | 4.555E−05 | | | | 87 |
| 1 | L | −2.161E−02 | | 2.777E+02 | −3.844E−03 | | | | | 87 |
| PS | L | 3.789E−04 | | 2.817E+02 | | | | | | 87 |
| PMMA | L | −6.305E−02 | 4.379E−02 | 3.193E+02 | 1.950E−02 | 2.235E−05 | | | | 87 |
| 1 | L | | | 2.500E+04 | | | | | | |

Figure 9:
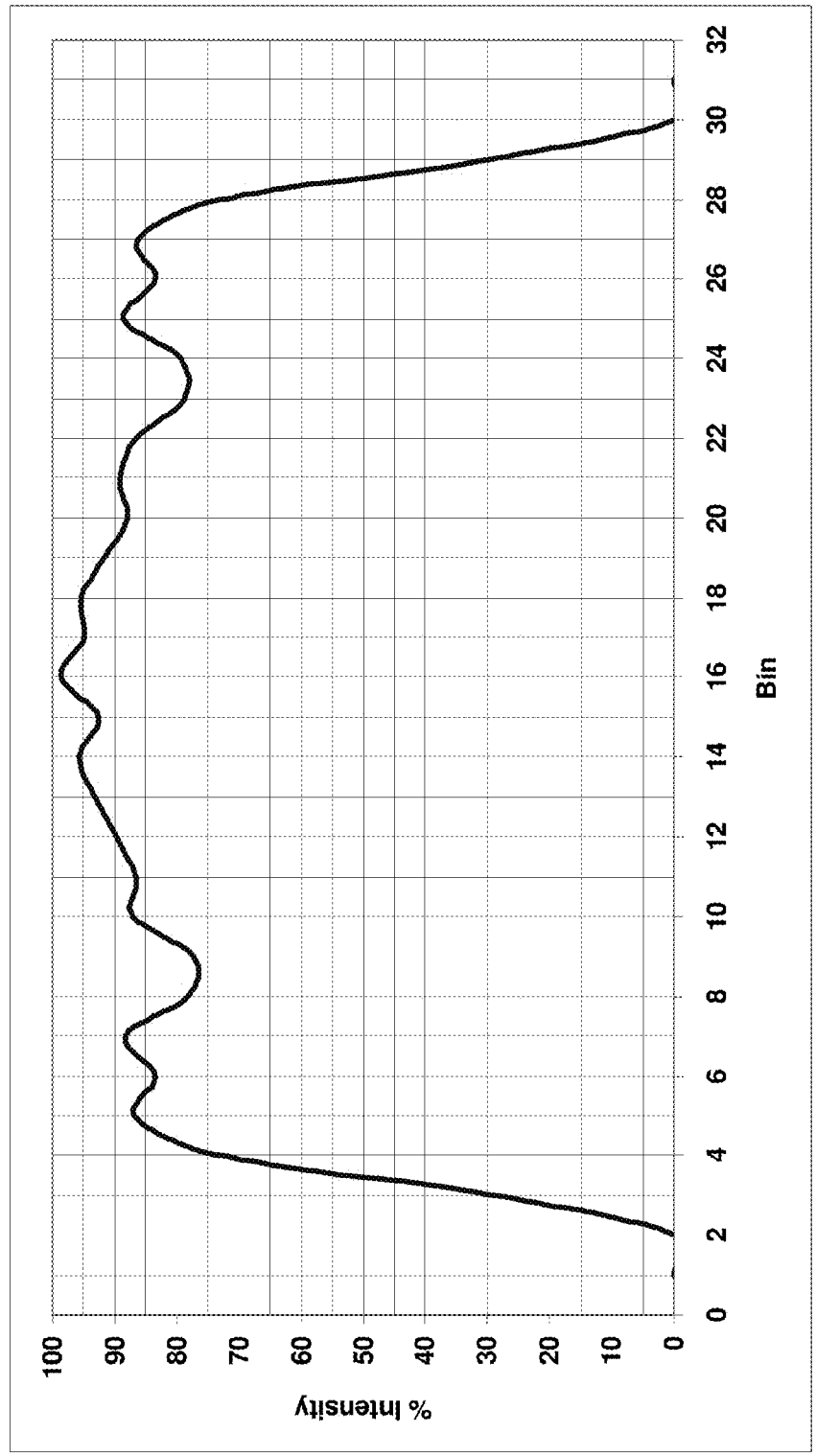
FIG. 9 shows the intensity profile across the output port of the NIO of the Preferred Embodiment.

The Preferred Embodiment is a luminaire having a 30 degree beam angle, a throw distance of about 80 feet, a luminous flux of about 5000 lumens, power consumption of about 60 watts, and a substantially flat brightness profile as seen in FIG. 9. Further, the system 27 is capable of hard edge focus for spotlight type use or soft edge focus for blending, floodlight or "wash" use. Further, system 27 is capable of projecting a gobo image from a gobo located near or at the object plane 39 which is usually near the exit port 22, or a shaped beam image by using movable blades located near or at the object plane 39. Further still, an iris may be located near or at the object plane 39 to adjust the diameter of the illuminated area in the illumination plane 29 produced by projected light from the projection imaging optics 30.

FIG. 9 shows the uniform flat, top hat intensity profile at cylinder 20 exit port 22 and on the illumination screen 29 of FIG. 12, whereas FIG. 7 shows the objectionable non-uniform intensity profile across the CPC 17 exit port 19.

Figure 13:
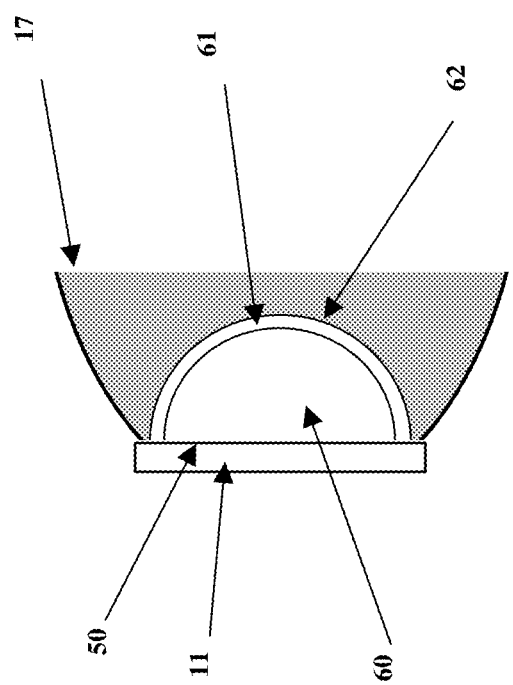
FIG. 13 shows a close-up of an emitter dome attachment to the NIO of the Preferred Embodiment.

Lambertian emitter 11 is a metal core board on which is mounted an array of about twenty-four warm white LED devices like the Cree XB-D devices. The metal core board may be mounted to a heat sink. The emitting area 50 has a 16 mm diameter. The center to center chip spacing in the array is about 2.6 mm arranged generally in the manner shown in FIG. 4. Of course, the chips need not be configured in a precise rectilinear fashion, but may have some rows or columns offset Referring to FIG. 8 and FIG. 13, some commercially available LED devices such as Cree MT-G devices, have a transparent hemispherical dome 60 over the emitting area 50. With such an emitter 11, attachment is made to the CPC 17 by means such as a layer of index matching fluid or optical cement 61 coupling the dome 60 to a mating dimple 62 in the input port surface 18 of CPC 17. Further, it is within the scope of the instant invention to use a multiplicity of domed Cree XB-D type devices to form the emitter 11. In that case a multiplicity of dimples 62 are formed in the input surface 18 of CPC 17 and all domes 60 are cemented into mating dimples 62.

Again referring to FIG. 12, depending on the launch point and launch direction of a light ray from emitter 11, the ray may either directly pass through the CPC 17, the cylinder 20, and out the output port 22 without reflecting off any side wall of the CPC 17 or cylinder 20, or such ray may be reflected one or more times by the sidewalls of CPC 17 and cylinder 20 before exiting through output port 22. The reflection is preferably produced by total internal reflection (TIR), but conductive mirror or reflective dielectric coatings well known in the art are functional equivalents. More than 91% of the light entering the input port 18, leaves the output port 22.

While the maximum half angle at the input port 18 was 90 degrees, the maximum half angle of the light at the exit port 22 is about 19 degrees when the light is still inside the acrylic.

Refraction at the exit port 22-to-air interface causes the maximum half angle in air to be about 30 degrees. Thus the second light beam pattern 5 (in FIG. 1) has a diameter of about 50 mm and a half angle of about 30 degrees just outside the exit port 22.

Referring to FIGS. 11 and 12, the projection IO 30 is a telecentric-input, short back focal length projection lens. Projection IO 30 comprises lens elements 31, 32, and 33 appropriately designed and shaped by methods well known in the art. Lens element 31, a plano-convex lens, is a separate element or in alternative designs may be adjacent to, contiguous with, or part of cylinder 20. Imaging optics 30 in this Preferred Embodiment has been achromatized by making lens element 33 a cemented doublet using polystyrene (PS) and polymethyl methacrylate (PMMA). Element 32 is an aspheric meniscus PMMA lens.

In this Preferred Embodiment, exit port 22 is normally coincident with object plane 39 of the projection IO 30. In other words, the output port 22 acts as the object plane 39 for the projection imaging optics 30.

The ray trace in FIG. 11 indicates how light from an axial point in the object plane 39 and light from a full field point in the object plane 39 propagates through the imaging optics with no substantial vignetting or loss. The ray bundle 25 originates from the on-axis point and is directed to the center of the distant illumination plane 29. The rays within this bundle 25 are substantially parallel. The ray bundle 26 originates from the full field point (25 mm from the optical axis) and is directed by projection imaging optics 30 to the edge of an illuminated disk on the distant illumination plane 29. The rays within this bundle 26 are substantially parallel and are at 15 degrees from the optical axis.

Of course, anti-reflection coatings are put on the surfaces of the lens elements in projection IO 30 to reduce light loss. In addition, as previously stated, there are many functional equivalents to the projection IO 30 shown in FIG. 11. The ray trace in FIG. 11 as well as illumination analysis indicate no substantial vignetting or light loss in the projection IO 30.

Thus projection IO 30 is an example of an imaging optical projection means 3 (in FIG. 1).

Referring to FIG. 11 and FIG. 12, a gobo (usually a thin patterned sheet metal plate) can be inserted in system 27 near the object plane 39. If projection IO 30 is positioned to form a real image, a real image of the gobo pattern will appear in the image plane, which can also be the illumination plane 29. In addition, industry standard movable blades can be inserted near the object plane 39 to provide an adjustable shaped pattern on the illumination plane 29 when system 27 is working in the real image mode. A fixed or adjustable iris may also be inserted near the object plane 39 to adjust the size of the spot illuminated in the illumination plane 29 when system 27 is working in the real image mode.

Gobos, blades and irises can also be used when the system 27 is operating in the afocal or virtual image mode. However in these cases the edges of the gobo, blade, or iris will not be in sharpest focus on the illumination plane 29. Nevertheless, such soft-edged pattern and edge images in the illumination plane 29 are desirable and useful in some situations.

System 27 is capable of producing several other effects such as a sharply focused gobo image inside a soft-edged patch of illumination in the illumination plane 29. This can be done, for example, by operating the system 27 in a real image mode, inserting a gobo near the object plane 39 and inserting blades or an iris between field lens 31 and objective lens element 33. Many such useful, creative and interesting effects can be produced by system 27 using such methods.

Also, by moving the projection IO 30 either toward or away from the output port 22, the flat top hat intensity profile at the illumination plane 29 can be modified to a bell shaped or Gaussian profile at the illumination plane 29. Finally, if a gobo, iris or blade assembly is held at the object plane 39 and is moved with the projection IO 30, then the intensity profile can be modified to a soft edged Gaussian profile while holding the gobo, iris or blade image in sharp focus at the illumination plane 29.

System 27 is also capable of providing a full range of brightness by adjusting the electrical current through one or more of the LED chips in emitter 11. System 27 is also capable of strobe and flickering effects by temporally changing or dithering the current levels through one or more of the LED chips in emitter 11. The drive current may be adjusted by methods well known in the art such as pulse width modulation.

The information controlling the operating characteristics of system 27 may be transferred to a luminaire that contains system 27 by such well known protocols as DMX512 which then control a computer board, microcontroller, or other circuitry within the luminaire. Direct manual control of the operating characteristics of the luminaire through the use of switches, potentiometers, rheostats, autotransformers and the like is a functional alternative.

It should be understood that different operating and design goals for a particular luminaire can be accommodated by using variations and adaptations of this Preferred Embodiment in FIG. 12, and that such adaptations are within the scope of the instant invention. For example, a 20 degree beam angle goal will generally require larger diameters and different curvatures on some surfaces of elements of the projection IO 30.

CONCLUSIONS, RAMIFICATIONS, AND SCOPE

Accordingly, the reader will see that the hybrid optical system of this invention can be used in a variety of luminaires with advantages in efficacy, efficiency, brightness, luminous flux, power, size, weight, performance, flexibility, and safety. These hybrid optical systems may be used in many applications such as (without limitation) theater and stage lighting, general lighting, accent lighting, architectural, residential lighting, and other specialty lighting applications.

Although the above description contains many specificities, these should not be construed as limitations on the scope of the invention, but as exemplifications of the presently preferred embodiments of this invention.

Thus the scope of the invention should be determined by the appended claims and their legal equivalents, not by the examples given.

I claim:

1. A hybrid optical system comprising:
a planar array of light emitting diode (LED) chips arranged in a circular area having a first diameter and a first etendue; a compound parabolic concentrator (CPC) nonimaging optical element having axial symmetry, circular cross sections, a circular CPC input port adjacent to said LED array having a second diameter and a second etendue, and a circular CPC output port having a third diameter and a third etendue; a cylindrical optical element having axial symmetry, a constant circular cross section, a fourth diameter, a fourth etendue and a first length; a gobo slot adjacent to said CPC output port; an object plane adjacent to said gobo slot; an imaging projection lens system, having a lens input port adjacent to said image plane, a fifth etendue, and a fifth diameter substantially equal to said fourth diameter, and a lens output port having a sixth diameter and sixth etendue;

Wherein, said LED array, said CPC nonimaging optical element, said gobo slot, said image plane and said projection lens system have a common optical axis; said second diameter is substantially equal to said first diameter; said third diameter is greater than 1.5 but less than 3.0 times said second diameter; said first length is greater than 1.5 but less than 3.0 times said third diameter; said fourth diameter is equal to said third diameter; said fifth diameter is equal to said fourth diameter; and said first, second, third, fourth, fifth and sixth etendues are all equal.

2. The hybrid optical system of claim 1, wherein marginal rays within a ray bundle leaving a point on said object plane intercept edge points on said lens output port.

3. A hybrid optical system comprising:

a planar array of light emitting diode (LED) chips arranged in a circular area having a first diameter and a first etendue; a compound parabolic concentrator (CPC) nonimaging optical element having axial symmetry, circular cross sections, a circular CPC input port adjacent to said LED array having a second diameter and a second etendue, and a circular CPC output port having a third diameter and a third etendue; a cylindrical optical element having axial symmetry, a constant circular cross section, a fourth diameter, a fourth etendue and a first length; a gobo slot adjacent to said CPC output port; an object plane adjacent to said gobo slot; an imaging projection lens system, having a lens input port adjacent to said image plane, a fifth etendue, and a fifth diameter substantially equal to said fourth diameter, and a lens output port having a sixth diameter and sixth etendue;

Wherein, said LED array, said CPC nonimaging optical element, said gobo slot, said image plane and said projection lens system have a common optical axis; said second diameter is substantially equal to said first diameter; said third diameter is greater than 1.5 but less than 3.0 times said second diameter; said first length is greater than 1.5 but less than 3.0 times said third diameter; said fourth diameter is equal to said third diameter; said fifth diameter is equal to said fourth diameter; and all marginal rays within a ray bundle leaving a point on said object plane intercept edge points on said lens input port.

4. The hybrid optical system in claim 3, wherein the optical system has a net throughput efficiency of greater than 85%.

* * * * *